(12) United States Patent
Kamerbeek et al.

(10) Patent No.: US 11,844,453 B2
(45) Date of Patent: Dec. 19, 2023

(54) CAPSULE FOR THE PREPARATION OF A BEVERAGE

(71) Applicant: Koninklijke Douwe Egberts B.V., Utrecht (NL)

(72) Inventors: Ralf Kamerbeek, De Meern (NL); Arend Hendrik Groothornte, Borculo (NL); Hielke Dijkstra, Neede (NL); Erik Pieter Van Gaasbeek, Borculo (NL)

(73) Assignee: Koninklijke Douwe Egberts N.V., Utrecht (NL)

( * ) Notice: Subject to any disclaimer, the term of this patent is extended or adjusted under 35 U.S.C. 154(b) by 0 days.

(21) Appl. No.: 18/074,386

(22) Filed: Dec. 2, 2022

(65) Prior Publication Data

US 2023/0096075 A1 Mar. 30, 2023

Related U.S. Application Data

(62) Division of application No. 16/630,392, filed as application No. PCT/NL2018/050486 on Jul. 13, 2018, now Pat. No. 11,540,659.

(30) Foreign Application Priority Data

Jul. 14, 2017 (NL) .................................. 2019253

(51) Int. Cl.
*A47J 31/36* (2006.01)
*A47J 31/40* (2006.01)
*B65D 85/804* (2006.01)

(52) U.S. Cl.
CPC ....... *A47J 31/3628* (2013.01); *A47J 31/3695* (2013.01); *A47J 31/407* (2013.01); *B65D 85/8043* (2013.01)

(58) Field of Classification Search
CPC .......... A47J 31/005; A47J 31/02; A47J 31/20; A47J 31/24; A47J 31/30; A47J 31/132;
(Continued)

(56) References Cited

U.S. PATENT DOCUMENTS

| 4,251,032 A | 2/1981 | Werding |
| 4,533,576 A | 8/1985 | Tanahashi |

(Continued)

FOREIGN PATENT DOCUMENTS

| AU | 2015255218 A1 | 11/2015 |
| AU | 2016253679 A1 | 11/2016 |

(Continued)

OTHER PUBLICATIONS

"Nespresso", Wikipedia Archive, published Nov. 29, 2012, 8 pages.
(Continued)

*Primary Examiner* — Phuong T Nguyen
(74) *Attorney, Agent, or Firm* — FITCH, EVEN, TABIN & FLANNERY, LLP

(57) ABSTRACT

The document describes an assembly of a capsule and brew chamber for a beverage preparation machine. The brew chamber has a first brew chamber part including a cavity for the capsule, and knives for piercing the capsule. The aluminum capsule body is frusto conical shaped and has a bottom, a side wall, a flange and a lid for closing the capsule. The flange is configured to be held between the first and a second brew chamber part, to provide a seal cooperating with a rim of the brew chamber parts. The bottom includes a slanted wall portion under an angle with a longitudinal axis through the capsule, and configured for cooperating with the knives which engage therewith upon closing of the brew chamber. This enables centering of the capsule relative to the central axis of the brew chamber prior to piercing thereof.

14 Claims, 9 Drawing Sheets

(58) Field of Classification Search
CPC .......... A47J 31/38; A47J 31/44; A47J 31/446;
A47J 31/467; A47J 31/468; A47J 31/605;
A47J 31/4407; A47J 31/5253; A47J
31/521; A23F 3/166
USPC ......... 99/280, 281, 282, 283, 284, 287, 292,
99/295, 297, 303, 306, 308, 322
See application file for complete search history.

(56) References Cited

U.S. PATENT DOCUMENTS

| | | |
|---|---|---|
| 4,651,538 A | 3/1987 | Bull |
| 4,913,951 A | 4/1990 | Pitolaj |
| 5,798,599 A | 8/1998 | Harwood |
| 5,897,899 A | 4/1999 | Fond |
| 6,550,157 B1 | 4/2003 | Harding |
| 6,854,378 B2 | 2/2005 | Jarisch |
| 8,176,714 B2 | 5/2012 | Abegglen |
| 8,613,246 B2 | 12/2013 | Ryser |
| 10,960,453 B2 | 3/2021 | Shabudin |
| 2001/0048178 A1 | 12/2001 | Jud |
| 2005/0061705 A1 | 3/2005 | Spallek |
| 2005/0084695 A1 | 4/2005 | Shirane |
| 2005/0155991 A1 | 7/2005 | Jackman |
| 2006/0110507 A1 | 5/2006 | Yoakim |
| 2007/0202237 A1 | 8/2007 | Yoakim |
| 2008/0044603 A1 | 2/2008 | Hutchinson |
| 2009/0017177 A1 | 1/2009 | Yoakim |
| 2009/0223373 A1 | 9/2009 | Kollep |
| 2009/0280219 A1 | 11/2009 | Yoakim |
| 2009/0320692 A1 | 12/2009 | Simanski |
| 2010/0015307 A1 | 1/2010 | Abegglen |
| 2010/0178404 A1 | 7/2010 | Yoakim |
| 2010/0183777 A1 | 7/2010 | Sagy |
| 2011/0000917 A1 | 1/2011 | Wolters |
| 2011/0020500 A1 | 1/2011 | Eichler |
| 2011/0027547 A1 | 2/2011 | Xun |
| 2011/0041702 A1 | 2/2011 | Yoakim |
| 2011/0185910 A1 | 8/2011 | Ryser |
| 2011/0185911 A1 | 8/2011 | Rapparini |
| 2011/0200725 A1 | 8/2011 | Kollep |
| 2011/0259204 A1 | 10/2011 | Kaeser |
| 2011/0315021 A1 | 12/2011 | Eichler |
| 2012/0031794 A1 | 2/2012 | Ozanne |
| 2012/0225168 A1 | 9/2012 | Kamerbeek |
| 2012/0231123 A1 | 9/2012 | Kamerbeek |
| 2012/0244384 A1 | 9/2012 | Burt |
| 2012/0251671 A1 | 10/2012 | Kamerbeek |
| 2012/0251694 A1 | 10/2012 | Kamerbeek |
| 2012/0272830 A1 | 11/2012 | Gugerli |
| 2013/0099597 A1 | 4/2013 | Perentes |
| 2013/0180408 A1 | 7/2013 | Eichler |
| 2013/0206014 A1 | 8/2013 | Jarisch |
| 2013/0224341 A1 | 8/2013 | Bendavid |
| 2013/0259982 A1 | 10/2013 | Abegglen |
| 2013/0340478 A1 | 12/2013 | Miyoshi |
| 2014/0170271 A1 | 6/2014 | Zweed |
| 2014/0178537 A1 | 6/2014 | Zweed |
| 2014/0199442 A1 | 7/2014 | Orsi |
| 2014/0328983 A1 | 11/2014 | Jarisch |
| 2015/0033947 A1 | 2/2015 | Van Der Kamp |
| 2015/0151903 A1 | 6/2015 | Bartoli |
| 2015/0158609 A1 | 6/2015 | Villain |
| 2015/0223632 A1 | 8/2015 | Hall |
| 2015/0297017 A1 | 10/2015 | Zingg |
| 2016/0037961 A1 | 2/2016 | Digiuni |
| 2016/0075506 A1 | 3/2016 | Chapman |
| 2016/0159563 A1 | 6/2016 | Bartoli |
| 2016/0353918 A1 | 12/2016 | Talon |
| 2016/0362246 A1 | 12/2016 | Garcin |
| 2016/0362247 A1 | 12/2016 | Bartoli |
| 2017/0158422 A1 | 6/2017 | Andreae |
| 2017/0325619 A1 | 11/2017 | Holten |
| 2018/0105355 A1 | 4/2018 | Harif |
| 2018/0257856 A1 | 9/2018 | Oliver |
| 2018/0273286 A1 | 9/2018 | Dijkstra |
| 2018/0289201 A1 | 10/2018 | Dijkstra |
| 2018/0290824 A1 | 10/2018 | Dijkstra |
| 2018/0290825 A1 | 10/2018 | Dijkstra |
| 2018/0297775 A1 | 10/2018 | Dijkstra |
| 2018/0297776 A1 | 10/2018 | Dijkstra |
| 2019/0077588 A1 | 3/2019 | Bartel |
| 2019/0177078 A1 | 6/2019 | Dijkstra |
| 2020/0047984 A1 | 2/2020 | Halliday |
| 2020/0047986 A1 | 2/2020 | Kamerbeek |
| 2020/0047987 A1 | 2/2020 | Kamerbeek |

FOREIGN PATENT DOCUMENTS

| | | |
|---|---|---|
| AU | 2017219060 A1 | 9/2017 |
| CA | 2901582 A1 | 11/2014 |
| CN | 105188488 | 12/2015 |
| DE | 102008014758 | 10/2009 |
| DE | 202009009125 | 9/2010 |
| DE | 102010027484 | 1/2012 |
| DE | 102010034260 | 2/2012 |
| DE | 102010047890 | 2/2012 |
| DE | 202013005950 | 10/2013 |
| DE | 202015044716 | 10/2015 |
| DE | 202016106171 U1 | 11/2016 |
| EP | 0468079 | 1/1992 |
| EP | 0844195 | 5/1998 |
| EP | 1165398 | 1/2002 |
| EP | 1190959 | 3/2002 |
| EP | 1299022 | 4/2003 |
| EP | 1339305 | 9/2003 |
| EP | 1646305 | 4/2006 |
| EP | 1654966 | 5/2006 |
| EP | 1700548 | 9/2006 |
| EP | 1700584 | 9/2006 |
| EP | 1816934 | 8/2007 |
| EP | 1839543 | 10/2007 |
| EP | 1849715 | 10/2007 |
| EP | 1859712 | 11/2007 |
| EP | 1859714 | 11/2007 |
| EP | 1882431 | 1/2008 |
| EP | 1882432 | 1/2008 |
| EP | 1892199 | 2/2008 |
| EP | 1900653 | 3/2008 |
| EP | 1967099 | 9/2008 |
| EP | 2012994 | 1/2009 |
| EP | 2029457 | 3/2009 |
| EP | 2068684 | 6/2009 |
| EP | 2070828 | 6/2009 |
| EP | 2142054 | 1/2010 |
| EP | 2151313 | 2/2010 |
| EP | 2205133 | 7/2010 |
| EP | 2229082 | 9/2010 |
| EP | 2230195 | 9/2010 |
| EP | 2284100 | 2/2011 |
| EP | 2284101 B1 | 2/2011 |
| EP | 2289820 A1 | 3/2011 |
| EP | 2308776 A1 | 4/2011 |
| EP | 2334564 | 6/2011 |
| EP | 2364930 | 9/2011 |
| EP | 2374383 | 10/2011 |
| EP | 2385922 | 11/2011 |
| EP | 2489609 A1 | 8/2012 |
| EP | 2512302 | 10/2012 |
| EP | 2516296 A1 | 10/2012 |
| EP | 2573008 | 3/2013 |
| EP | 2631198 | 8/2013 |
| EP | 2631199 | 8/2013 |
| EP | 2682028 | 1/2014 |
| EP | 2690035 | 1/2014 |
| EP | 2712824 A1 | 4/2014 |
| EP | 2757056 | 7/2014 |
| EP | 2801538 | 11/2014 |
| EP | 2868598 | 5/2015 |
| EP | 3023360 | 5/2016 |
| ES | 1137034 U | 3/2015 |
| ES | 1142506 U | 8/2015 |
| FR | 2973209 | 10/2012 |
| GB | 2503697 | 1/2014 |
| GB | 2503774 | 1/2014 |

(56) References Cited

FOREIGN PATENT DOCUMENTS

| | | |
|---|---|---|
| GB | 2519319 A | 4/2015 |
| GB | 2523775 A | 9/2015 |
| WO | 0056629 | 9/2000 |
| WO | 0200073 | 1/2002 |
| WO | 02035977 | 5/2002 |
| WO | 2005004683 | 1/2005 |
| WO | 2006045515 | 5/2006 |
| WO | 2006045536 A1 | 5/2006 |
| WO | 2006045537 | 5/2006 |
| WO | 2007113110 | 10/2007 |
| WO | 2007122206 A1 | 11/2007 |
| WO | 2007122208 | 11/2007 |
| WO | 2007137974 | 12/2007 |
| WO | 2008037642 A1 | 4/2008 |
| WO | 2009043630 | 4/2009 |
| WO | 2009090201 | 7/2009 |
| WO | 2009115474 A1 | 9/2009 |
| WO | 2009128016 A1 | 10/2009 |
| WO | 2010034663 | 4/2010 |
| WO | 2010055465 A1 | 5/2010 |
| WO | 2010084475 A2 | 7/2010 |
| WO | 2010115970 A1 | 10/2010 |
| WO | 2010116284 A2 | 10/2010 |
| WO | 2010128844 A1 | 11/2010 |
| WO | 2010137946 | 12/2010 |
| WO | 2010137952 A1 | 12/2010 |
| WO | 2011000005 A1 | 1/2011 |
| WO | 2011010263 | 1/2011 |
| WO | 2011061126 | 5/2011 |
| WO | 2011073310 | 6/2011 |
| WO | 2011092301 | 8/2011 |
| WO | 2011113854 A2 | 9/2011 |
| WO | 2012011053 A1 | 1/2012 |
| WO | 2012013556 A1 | 2/2012 |
| WO | 2012038063 A1 | 3/2012 |
| WO | 2012045184 A1 | 4/2012 |
| WO | 2012100836 | 8/2012 |
| WO | 2012110323 A1 | 8/2012 |
| WO | 2012118367 A1 | 9/2012 |
| WO | 2012120459 A1 | 9/2012 |
| WO | 2012122329 A1 | 9/2012 |
| WO | 2012123857 A1 | 9/2012 |
| WO | 2012144885 A1 | 10/2012 |
| WO | 2013043048 A1 | 3/2013 |
| WO | 2013046014 A1 | 4/2013 |
| WO | 2013053655 A1 | 4/2013 |
| WO | 2013060654 A1 | 5/2013 |
| WO | 2013060918 A1 | 5/2013 |
| WO | 2013068242 A1 | 5/2013 |
| WO | 2013079811 A1 | 6/2013 |
| WO | 2013132435 A1 | 9/2013 |
| WO | 2013135937 A2 | 9/2013 |
| WO | 2013136209 A1 | 9/2013 |
| WO | 2013136240 A1 | 9/2013 |
| WO | 2013144838 A1 | 10/2013 |
| WO | 2013153169 A2 | 10/2013 |
| WO | 2013157924 A1 | 10/2013 |
| WO | 2013157927 A | 10/2013 |
| WO | 2013164669 A1 | 11/2013 |
| WO | 2013189923 A1 | 12/2013 |
| WO | 2013190426 A1 | 12/2013 |
| WO | 2014001584 A1 | 1/2014 |
| WO | 2014012779 A2 | 1/2014 |
| WO | 2014012783 A2 | 1/2014 |
| WO | 2014033344 A1 | 3/2014 |
| WO | 2014053638 A1 | 4/2014 |
| WO | 2014067507 A2 | 5/2014 |
| WO | 2014072942 A2 | 5/2014 |
| WO | 2014076041 A1 | 5/2014 |
| WO | WO-2014076041 A1 * | 5/2014 .......... A47J 31/3628 |
| WO | 2014118812 A1 | 8/2014 |
| WO | 2014125390 A1 | 8/2014 |
| WO | 2014128315 A1 | 8/2014 |
| WO | 2014167526 A1 | 10/2014 |
| WO | 2014184651 A1 | 11/2014 |
| WO | 2014184652 A1 | 11/2014 |
| WO | 2014184653 A1 | 11/2014 |
| WO | 2014191412 A1 | 12/2014 |
| WO | 2014191413 A1 | 12/2014 |
| WO | 2014198474 A1 | 12/2014 |
| WO | 2014202105 A1 | 12/2014 |
| WO | 2015011683 A1 | 1/2015 |
| WO | 2015056202 A1 | 4/2015 |
| WO | 2015075584 A1 | 5/2015 |
| WO | 2015082982 A1 | 6/2015 |
| WO | 2015087180 A1 | 6/2015 |
| WO | 2015101394 A1 | 7/2015 |
| WO | 2015104171 A1 | 7/2015 |
| WO | 2015104172 A1 | 7/2015 |
| WO | 2015128527 A1 | 9/2015 |
| WO | 2015128799 A1 | 9/2015 |
| WO | 2015128827 A1 | 9/2015 |
| WO | 2015180960 A1 | 12/2015 |
| WO | 2016041596 A1 | 3/2016 |
| WO | 2016074189 A1 | 5/2016 |
| WO | 2016186488 A1 | 11/2016 |
| WO | 2016186489 A1 | 11/2016 |
| WO | 2016186491 A1 | 11/2016 |
| WO | 2016186492 A1 | 11/2016 |
| WO | 2016186496 A1 | 11/2016 |
| WO | 2017074189 A1 | 5/2017 |

OTHER PUBLICATIONS

EPO Communication pursuant to Article 94(3) EPC, dated Mar. 18, 2022, EP Application No. 16744557.6, 4 pgs.
EPO Communication purusant to Article 94(3) EPC, dated Dec. 20, 2018, EP Application No. 16744557.6, 3 pgs.
EPO Communication purusant to Article 94(3) EPC, dated Jan. 17, 2018, EP Application No. 16744557.6, 4 pgs.
International Preliminary Report on Patentability, PCT/NL2016/050341, Koninklijke Douwe Egberts B.V., 8 pages (dated Nov. 21, 2017).
International Preliminary Report on Patentability, PCT/NL2016/050342, Koninklijke Douwe Egberts B.V., 8 pages (dated Nov. 21, 2017).
International Preliminary Report on Patentability, PCT/NL2016/050344, Koninklijke Douwe Egberts B.V., 8 pages (dated Nov. 21, 2017).
International Preliminary Report on Patentability, PCT/NL2016/050346, Koninklijke Douwe Egberts B.V., 7 pages (dated Nov. 21, 2017).
International Preliminary Report on Patentability, PCT/NL2016/050349, 7 pages (dated Nov. 21, 2017).
International Preliminary Report on Patentability, PCT/NL2016/050350, Koninklijke Douwe Egberts B.V., 8 pages (dated Nov. 21, 2017).
International Preliminary Report on Patentability, PCT/NL2016/050749, Koninklijke Douwe Egberts B.V., 7 pages (dated May 1, 2018).
International Preliminary Report on Patentability, PCT/NL2017/050663, 7 pages (dated Apr. 9, 2019).
International Search Report and Written Opinion, PCT/NL2016/050341, Koninklijke Douwe Egberts B.V., 13 pages (dated Oct. 27, 2016).
International Search Report and Written Opinion, PCT/NL2016/050342, Koninklijke Douwe Egberts B.V., 13 pages (dated Nov. 8, 2016).
International Search Report and Written Opinion, PCT/NL2016/050344, Koninklijke Douwe Egberts B.V., 13 pages (dated Oct. 27, 2016).
International Search Report and Written Opinion, PCT/NL2016/050346, Koninklijke Douwe Egberts B.V., 12 pages (dated Nov. 10, 2016).
International Search Report and Written Opinion, PCT/NL2016/050350, Koninklijke Douwe Egberts B.V., 13 pages (dated Nov. 2, 2016).
International Search Report and Written Opinion, PCT/NL2016/050749, Koninklijke Douwe Egberts B.V., 10 pages (dated Feb. 22, 2017).

(56) References Cited

OTHER PUBLICATIONS

International Search Report and Written Opinion, PCT/NL2017/050300, 13 pages (dated Jul. 19, 2017).
International Search Report and Written Opinion, PCT/NL2017/050301, 15 pages (dated Jul. 19, 2017).
International Search Report and Written Opinion, PCT/NL2017/050659, 12 pages (dated Jan. 17, 2018).
International Search Report and Written Opinion, PCT/NL2017/050663, 12 pages (dated Jan. 17, 2018).
International Search Report and Written Opinion, PCT/NL2018/050486, 14 pages (dated Oct. 18, 2018).
Notice of Opposition, dated Jan. 24, 2020 for EP Application No. 16744560.0, 41 pages.
Nullity Action on DE 202016106171.7, 96 pages (Dec. 20, 2019).
Reply to Dec. 20, 2018 communication pursuant to Art. 94(3) EPC, dated Jul. 1, 2019, EP Application No. 16744557.6, 53 pgs.
Reply to Jan. 17, 2018 communication pursuant to Art. 94(3) EPC, dated Jul. 19, 2018, EP Application No. 16744557.6, 19 pgs.
Reply to Mar. 18, 2022 communication pursuant to Art. 94(3) EPC, dated Sep. 28, 2022, EP Application No. 16744557.6, 13 pgs.
Third Party Observation, dated May 14, 2020, EP Application No. 16744557.6, 5 pgs.

* cited by examiner

CAPSULE FOR THE PREPARATION OF A BEVERAGE

CROSS REFERENCE TO RELATED APPLICATIONS

This application is a division of U.S. patent application Ser. No. 16/630,392, filed Jan. 10, 2020, which is a U.S. national phase application of International Application No. PCT/NL2018/050486, filed Jul. 13, 2018, which claims benefit from Netherlands Application 2019253, filed Jul. 14, 2017, which are each hereby incorporated herein by reference in their entirety.

FIELD OF THE INVENTION

The present invention is directed at an assembly of a capsule and a brew chamber, wherein the brew chamber is configured for use in a beverage preparation machine, wherein the brew chamber comprises a first brew chamber part and a second brew chamber part arranged for cooperating with each other for, upon closing of the first brew chamber part with the second brew chamber part, forming the brew chamber, the first brew chamber part having a cavity for holding the capsule, and further including a plurality of knives located in the cavity concentrically arranged around a central axis of the brew chamber for piercing the capsule upon closing of the first brew chamber part with the second brew chamber part, wherein the capsule comprises a capsule body and lid closing an open end of the capsule body, the capsule body being frusto conically shaped, wherein the capsule body comprises a bottom opposite the open end, a side wall extending from the bottom, and a flange extending outwardly from the side wall near the open end, wherein the lid is attached to the flange and is configured to be opened under fluid pressure for forming the outlet side of the capsule, and wherein the capsule is hermetically closed, wherein the bottom of the capsule is configured to be pierced by the knives of the first brew chamber part for forming the inlet side of the capsule. The invention is further directed at a brew chamber and at a capsule for use in an assembly as referred to above, and further at a beverage preparation machine including such a brew chamber. Further more, the invention is directed at a use of a capsule as referred to above in an assembly, or in a brew chamber, or in a beverage preparation machine as recited.

BACKGROUND

Capsule based beverage preparation machines require the loading of a capsule into the machine for brewing beverages. Such machines are very popular due to their ability to allow the preparation of constant quality brews in domestic, semi-professional and professional environments. To a private user, this allows him or her to serve top quality beverages at home to guests or for own use, without the necessity to go out and visit a coffee bar or café. Moreover, the available capsules provide a large variety of different types and tastes of beverages of constant level non-varying quality.

In a capsule based beverage preparation machine, beverage preparation essentially takes place within the assembly formed by the brew chamber and the correspondingly shaped capsule that is to be loaded therein. Therefore, the capsule is usually loaded into a brew chamber first. Next, the brew chamber may be closed and sealed, and the capsule is pierced. Thereafter, a fluid (typically water) is injected into the capsule. The capsule is filled with a beverage ingredient, which upon mixing with the fluid creates the desired beverage. Typically, the capsule cooperates with parts of the brew chamber, e.g. a suitably shaped extraction plate, to create an outflow opening as a result of the increasing pressure in the capsule. This allows the prepared beverage to flow out, after which it is collected and led towards a receptacle, e.g. a cup.

Proper sealing of the brew chamber during brewing is an important aspect of the brewing process to ensure that the beverage is prepared at the expected level of quality associated with that particular capsule type. If the sealing of the brew chamber is insufficient, the injected fluid or semi-prepared beverage may leak out of the brew chamber without being collected in the receptacle or before proper mixing with the ingredient has occurred. As will be understood, if the level of sealing differs per each use, so will the quality of the prepared beverage be different for each use, which is not desired.

For a number of capsule based beverage preparation machines, to obtain a proper sealing of the brew chamber, it is important that the capsule is well aligned with the brew chamber. In such machines, the sealing of the brew chamber may be optimal if the capsule is neatly centered in relation to the notional central axis of the brew chamber. The above is in particular the case with capsules that comprise a flange which is clasped between a first and second brew chamber part when the brew chamber is closed, e.g. between a brew chamber cavity and a correspondingly formed extraction plate that closes the brew chamber. In such cases, incorrect alignment of a longitudinal axis through the capsule with a central axis of the brew chamber (i.e. when the capsule is not or not well centered in the brew chamber) may cause excessive leakage of the brew chamber during preparation of the beverage.

Some of these machines comprise dedicated elements in the walls of the brew chamber, such as ridges or protrusions, that contribute to the centering of the capsule during closing of the brew chamber. However, such dedicated elements are not available in all capsule based brewing machines. In absence thereof, the capsule must be centered in a different manner to ensure the desired proper sealing of the chamber.

SUMMARY OF THE INVENTION

It is an object of the present invention to overcome the abovementioned difficulties and to provide an assembly of a capsule and a brew chamber for use in a beverage preparation machine, wherein a self-centering of the capsule within the brew chamber upon closing of the brew chamber is achieved, even in absence of dedicated centering elements in the walls of a brew chamber.

To this end, in accordance with a first aspect, there is provided herewith an assembly of a capsule and a brew chamber, wherein the brew chamber is configured for use in a beverage preparation machine, wherein the brew chamber comprises a first brew chamber part and a second brew chamber part arranged for cooperating with each other for, upon closing of the first brew chamber part with the second brew chamber part, forming the brew chamber, the first brew chamber part having a cavity for holding the capsule, and further including a plurality of knives located in the cavity concentrically arranged around a central axis of the brew chamber for piercing the capsule upon closing of the first brew chamber part with the second brew chamber part; wherein the capsule comprises a capsule body and lid closing an open end of the capsule body, the capsule body being frusto conically shaped, wherein the capsule body comprises a bottom opposite the open end, a side wall extending from the bottom, and a flange extending outwardly from the side wall near the open end, wherein the lid is attached to the flange and is configured to be opened under fluid pressure for forming the outlet side of the capsule, and wherein the capsule is hermetically closed, wherein the bottom of the capsule is configured to be pierced by the knives of the first brew chamber part for forming the inlet side of the capsule, and wherein the capsule body and the lid are made from aluminum; wherein the flange of the capsule is wider than the bottom, and wherein the flange is configured to be held between the first and the second brew chamber part, the flange being formed such as to provide a seal, wherein the seal cooperates with a rim of the first brew chamber part for sealing the brew chamber upon closing thereof; and wherein the bottom of the capsule comprises a slanted wall portion which is circumferentially arranged around a longitudinal axis of the capsule, wherein the slanted wall portion is oriented under an angle with the longitudinal axis, for centering the capsule relative to the central axis of the brew chamber prior to piercing of the capsule due to slipping of the at least one of the knives upon engaging of the at least one knife on the slanted wall portion.

In accordance with the present invention, the slanted wall portion being oriented under an angle with the longitudinal axis. This results in a relatively low static friction coefficient of the slanted wall portion which will cause each of the knives to slip upon engagement on the slanted wall portion in case, upon engagement of such a knife, the capsule is not yet fixated leaving some degree of freedom in movement of the capsule relative to the respective knife. Thus, slipping occurs when at least one, but not all knives engage on the surface of the slanted wall portion. This will force the capsule in a centered orientation with respect to the central axis of the brew chamber.

The slanted wall portion is oriented under an angle with the longitudinal axis through the capsule. The slanted wall portion cooperates, in use, with the circumferentially arranged knives in the cavity of the first brew chamber part. When the knives of the first brew chamber part engage with the slanted wall portion, slipping of the knives on the surface of the slanted wall portion occurs in case the capsule is not well centered to the brew chamber. In other words, if the longitudinal axis through the capsule is not or not sufficiently aligned with the central axis through the brew chamber, the one or more knives that will first touch the surface of the slanted wall portion will slip on the surface. As a result, the capsule will slightly move (rotate) such that the longitudinal axis through the capsule will become aligned with the central axis through the brew chamber. Hence, the capsule will self-center within the brew chamber, upon closing of the brew chamber.

When all the circumferentially arranged knives in the cavity of the brew chamber are in contact with the slanted wall portion, the slipping of the knives on the surface of the slanted wall portion will seize, and the position of the capsule with respect to the brew chamber will be fixed. During the closing of the first brew chamber part by the second brew chamber part, this will cause the knives to penetrate the wall of the capsule body, to thereby create an inlet to the capsule body interior.

As may be appreciated, slipping of a knife on the surface of the slanted wall portion will occur when the force exerted by the knife on the surface comprises a component parallel to the surface that exceeds a static frictional threshold force of the knife on the surface, while at the same time a force component that is perpendicular to the surface of the slanted wall portion does not exceed a threshold force that is necessary to penetrate the wall. Before the flange of the capsule is clasped in between the first brewing chamber part and the second brewing chamber part, the capsule is not yet fixated within the cavity of the first brew chamber part. Therefore, when the first knife touches the surface of the slanted wall portion, the capsule has sufficient degrees of freedom to slightly move and be repositioned in the cavity. As a result, the static frictionally threshold force is relatively small, causing the knife to easily slip on the surface such as to allow self-centering of the capsule with respect to the concentrically arranged knives.

In accordance with some embodiments, the bottom of the capsule comprises a ledge, wherein the ledge is concentrically arranged around the slanted wall portion and contiguous therewith, for providing a piercing ledge for piercing the capsule after centering thereof. The ledge, which is concentrically arranged around the slanted wall portion and contiguous therewith, provides a resting area for the knives in case slipping occurs on the slanted wall portion. Therefore, piercing of the capsule bottom will occur on the ledge. Therefore, to obtain optimal centering, the edge between the slanted wall portion and the ledge, i.e. where the slanted wall portion turns to the ledge, is concentrically located just inner to the intended piercing locations associated with optimal centering. Typically, the knives are also concentrically arranged at a fixed radius at various locations around the central axis through the brew chamber. In that case, preferably the edge on the capsule will have a radius that corresponds therewith, such that piercing takes place when the longitudinal axis of the capsule is optimally aligned with the central axis through the brew chamber. As may be appreciated, this may be released somewhat dependent on any allowable tolerance in terms centering.

In accordance with a further embodiment, the bottom of the capsule comprises a further wall portion concentrically arranged around the slanted wall portion or the ledge, the further wall portion being oriented under a further angle with the longitudinal axis. The combination of, from the center of the capsule to the edge between the bottom and the side wall of the capsule, a slanted wall portion, a ledge and a further wall portion that is also angled, provides for some additional structural integrity that reduced any bending of the bottom wall under the pressure of the knives during piercing.

Preferably, even, the orientation of the further wall portion is such that an inner edge of the slanted wall portion (closest to the longitudinal axis) is located in line with the tangent of the further wall portion. With the ledge in between the slanted wall portion and the further wall portion, the angle of slanted wall portion with respect to the longitudinal axis will then be smaller than the angle between the further wall portion and the longitudinal axis. This further decreases the friction coefficient of the slanted wall portion, thereby improving it's centering ability.

The angle of the slanted wall portion with respect to the longitudinal axis must be small enough for the slipping to occur. At small angles, the knives which are typically oriented parallel to the central axis of the cavity, touch the surface at corresponding small angles. The abovementioned requirement for slipping are more easily met. In the assembly of the present invention, the flange of the capsule is correspondingly shaped or formed such as to form a seal that cooperates with a rim on the first brew chamber part. In particular for these type of capsules, proper centering of the capsule with respect to the rim of the first brew chamber part is important for obtaining a proper seal of the brew chamber. Therefore, the advantages of the present invention with these type of capsules are evident. An incorrect centering of the capsule would easily result in an insufficient seal of the brew chamber, and leaking of the brew chamber during the preparation of the beverage.

In accordance with some embodiments, the angle of the slanted wall portion of the capsule with respect to the longitudinal axis is smaller than 60 degrees, preferably smaller than 55 degrees. Good results for example have been obtained with slanted wall portions having an angle with respect to the longitudinal axis of approximately 49 degrees. However, the angle of the slanted wall portion with respect to the longitudinal axis may be different, for example 42 degrees, 47 degrees, 48 degrees, 50 degrees, 51 degrees, or 55 degrees. In fact, the angle at which slipping occurs may further dependent on factors such as: the stiffness of the capsule top, the velocity of the piercing knives, the shape of the top, the material type or thickness—for example determining how difficult or easy the capsule material has the tendency to dent. The optimal angle of the slanted wall portion may depend also on these factors. The forces exerted by the knife on the surface resolve into force components parallel to the surface that exceed force components transverse to the surface. Hence slipping easily occurs, causing self-centering of the capsule.

In some embodiments, upon closing of the first brew chamber part with the second brew chamber part, the seal is clasped between the first and second brew chamber part against the rim of the first brew chamber part for providing the sealing of the brew chamber. In these embodiments, the seal is formed of a folded wall portion of the flange, and the rim is correspondingly shaped with the folded wall portion for enabling the sealing of the brew chamber.

In particular where the seal is formed of a folded wall portion of the flange, incorrect centering of the capsule with respect to the brew chamber may cause the flange to become damaged when the flange is clasped in between the first brew chamber part and the second brew chamber part. Because fluid is to be dispensed in the brew chamber during beverage preparation under relatively high pressure (8 to 19 bars), a first brew chamber part and a second brew chamber part are pressed tightly to each other to prevent leaking. Under these pressures, a seal that is formed on a folded wall portion may easily become damaged if the capsule is not well centered. Therefore, the self centering effect of the assembly in accordance with a present invention is particularly advantageous with capsules wherein the seal is formed of a folded wall portion, as is proposed in respect of the present embodiments. Moreover, it is observed that the forming of a seal on the flange of a folded wall portion provides additional advantages during manufacturing of the capsule. This is because the proper folding of a flange is a relatively straight forward manner of creating structures and edges of the flange that may serve as a seal, and prevents the necessity to provide additional elements such as sealing range or other wall portions that may complicate the manufacturing process. In particular in accordance with the present invention, where the capsules are completely made of aluminum, such folding is straight forwardly achieved during manufacturing.

In some of these embodiments, the rim includes a groove and wherein the flange is folded such as to form an edge that falls into the groove upon closing of the first brew chamber part with the second brew chamber part after said centering of the capsule.

Some beverage preparation machines include a brew chamber having a first brew chamber part which includes a rim wherein the rim already includes a groove that allows cooperation with the correspondingly shaped seal in the form of an edge that falls into the groove upon closing of the first brew chamber part with a second brew chamber part. The present invention, wherein the capsules comprise the additional slanted wall portion defined above, is particular advantageous in combination with such machines.

In accordance with some embodiments, the angle of the slanted wall portion with respect to the longitudinal axis is dependent on one or more material properties of the capsule, wherein the material properties include at least one of: a material hardness of the capsule body, a surface roughness of the slanted wall portion, and a wall thickness of the capsule body.

As explained above, slipping of the knives on the surface of the slanted wall portion is achieved due to correct angling of the slanted wall portion with respect to the longitudinal axis. In addition, as such slipping is based on overcoming the frictional forces between the capsule and the knives prior to the knife penetrating the material of the wall, additional measures may be taken to improve the self-centering effect. For example, to increase the probability of slipping of the knives, the surface of the slanted wall portion may be smoothened. For example, the surface may be polished or otherwise processed, or may be covered with a coating that makes the surface very smooth. In addition to this, in order to increase the threshold force that is required to be overcome in order to penetrate the wall, a material hardness of the capsule body may be increased. This may be achieved in various manners, for example by preprocessing of the aluminum from which the capsules are made, or (as already suggested above) by coating of the wall of the capsule (or at least the slanted wall portion) such as to increase the hardness of the surface. Also, the thickness of the capsule body may be a parameter to tune in this respect.

Furthermore, in accordance with some embodiments, the brew chamber further comprises a fluid dispensing device for supplying an amount of fluid, such as water, under pressure to the first brew chamber part, for providing the fluid to the capsule through the inlet side for providing the fluid pressure for opening the lid.

In accordance with a second aspect, there is provided a brew chamber for use in an assembly described above, wherein the brew chamber is configured for use in a beverage preparation machine, wherein the brew chamber comprises a first brew chamber part and a second brew chamber part arranged for cooperating with each other for, upon closing of the first brew chamber part with the second brew chamber part, forming the brew chamber, the first brew chamber part having a cavity for holding a capsule having a frusto conical shaped capsule body, the first brew chamber part further including a plurality of knives located in the cavity concentrically arranged around a central axis of the brew chamber for piercing the capsule upon closing of the first brew chamber part with the second brew chamber part; wherein the first and the second brew chamber part are configured for holding a flange of the capsule therebetween, the flange being formed such as to provide a seal, wherein the first brew chamber part comprises a rim configured for cooperating with the seal for sealing the brew chamber upon closing thereof, and the knives of the first brew camber part are located in the cavity such as to engage with a slanted wall portion of the capsule body, wherein the knives are placed such as to center the capsule relative to the central axis of the brew chamber prior to piercing of the capsule due to slipping of at least one of the knives on the slanted wall portion upon engaging of the knives.

In accordance with a third aspect, there is provided a beverage preparation machine including a brew chamber as described above, or for use in an assembly in accordance with the first aspect.

Yet, in accordance with a fourth aspect, there is provided a capsule for the preparation of a beverage from a beverage preparation machine, the capsule being configured for use in an assembly according to the first aspect described above, the capsule further configured for being inserted into a brew chamber of the beverage preparation machine, wherein the brew chamber is closable by closing of a first brew chamber part with a second brew chamber part cooperating therewith, the first brew chamber part having a cavity for holding the capsule, and further including a plurality of knives located in the cavity concentrically arranged around a central axis of the brew chamber, wherein the capsule comprises a capsule body and lid closing an open end of the capsule body, the capsule body being frusto conically shaped, wherein the capsule body comprises a bottom opposite the open end, a side wall extending from the bottom, and a flange extending outwardly from the side wall near the open end, wherein the lid is attached to the flange and is configured to be opened under fluid pressure for forming the outlet side of the capsule, and wherein the capsule is hermetically closed, wherein the bottom of the capsule is configured to be pierced by the knives of the brew chamber for forming the inlet side of the capsule, and wherein the capsule body and the lid are made from aluminum; wherein the flange of the capsule is wider than the bottom, and wherein the flange is configured to be held between the first brew chamber part and a second brew chamber part of the brew chamber, the flange being formed such as to provide a seal, wherein the seal is configured for cooperating with a rim of the first brew chamber part for sealing the brew chamber upon closing thereof, and wherein the bottom of the capsule comprises a slanted wall portion which is circumferentially arranged around a longitudinal axis of the capsule, wherein the slanted wall portion is configured for cooperating with the knives such that the knives engage with the slanted wall portion upon closing of the brew chamber, wherein the slanted wall portion is oriented under an angle with the longitudinal axis, for centering the capsule relative to the central axis of the brew chamber prior to piercing of the capsule due to slipping of the at least one of the knives upon engaging of the at least one knife on the slanted wall portion.

In accordance with a fifth aspect, the invention relates to the use of a capsule according to the fourth aspect in an assembly according to the first aspect, or in a brew chamber according to the second aspect, or in a beverage preparation machine in accordance with the third aspect described above.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1B:
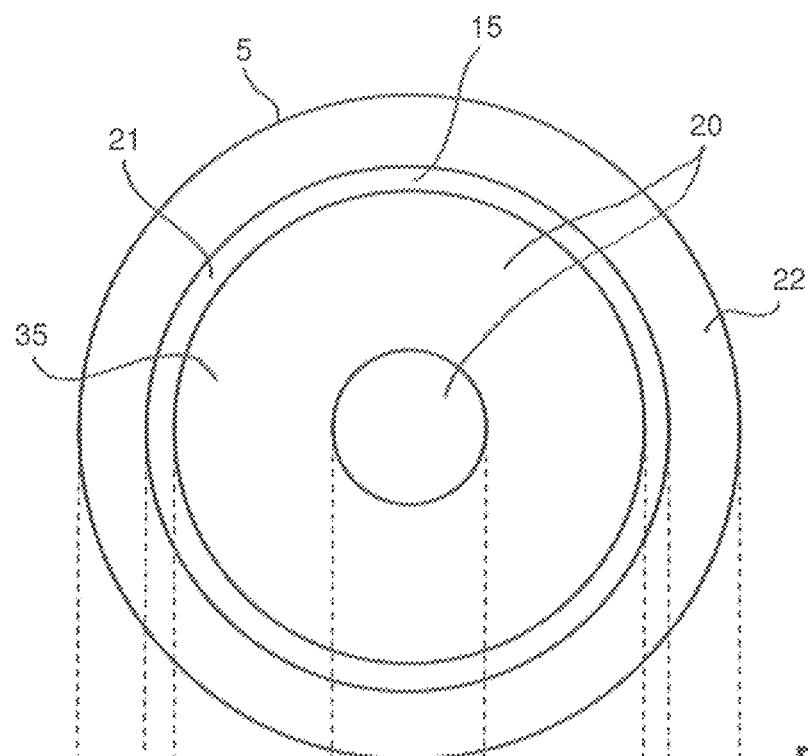
FIGS. 1*a* and 1*b* respectively illustrate a side view and a top view of a capsule for use in an assembly in accordance with an embodiment.
Figure 1A:
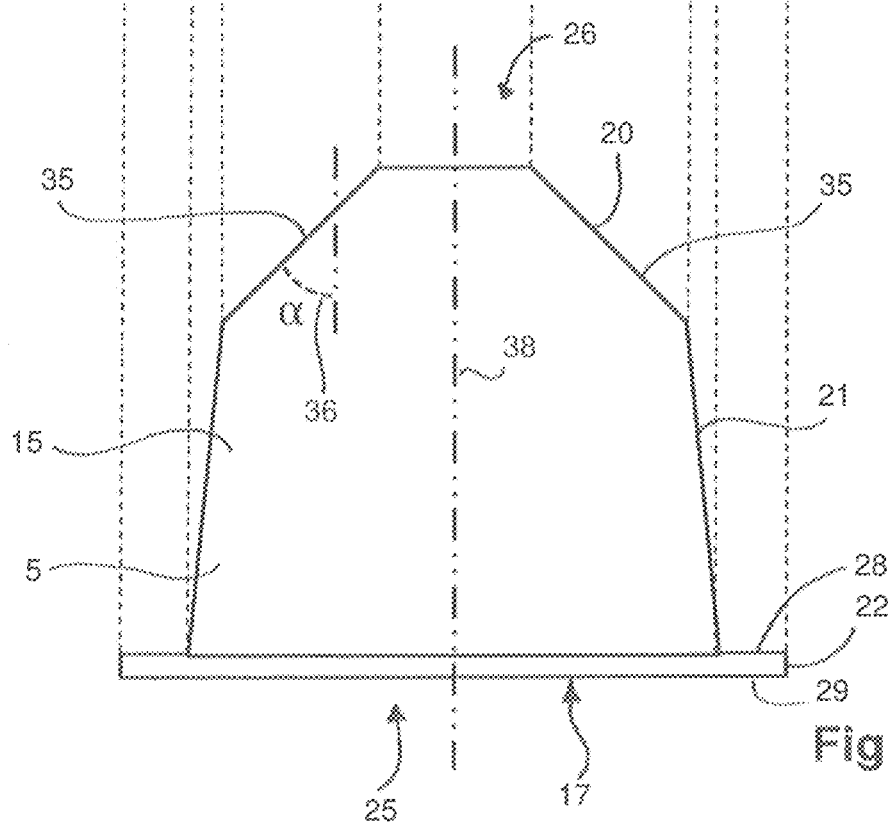

FIGS. 1A and 1B schematically illustrate a capsule 5 for use in an assembly 1 in accordance with an embodiment of the present invention. FIG. 1B illustrates a top view of the capsule 5 while FIG. 1A illustrates a side view of the capsule. The FIGS. 1A and 1B are schematic, and various details of the capsule have been omitted in order to prevent obscuring a description of the invention. The capsule 5 comprises a capsule body 15. The capsule 5 is illustrated in FIG. 1A face down. The capsule body 15 on the upper side thereof is closed with a lid 17 attached to the flange 22 of the capsule 5. The lid 17 may be formed of a aluminum foil or sheet, and reference numeral 17 indicates the location of the lid on the capsule. The capsule body 15 further comprises side walls 21. The capsule 5 is symmetrically shaped around a longitudinal axis 38. Therefore, the side wall 21 is a slanted cylindrical side wall symmetric around longitudinal axis 38. The capsule 5 is frusto conically shaped. The bottom 20 of the capsule body thereby has an explicit conical shape as illustrated in FIG. 1A. The conical shape of the bottom 20 is provided by a slanted wall portion 35, which is cylindrically symmetric around longitudinal axis 38. The slanted wall portion 35 is oriented under an angle α 36 with the longitudinal axis 38.

In use, the capsule will be inserted into the brew chamber 3. In many cases, the brew chamber will be arranged in a more or less horizontal orientation, such that gravity may act on the capsule in a direction more or less transverse to the central axis 13 of the brew chamber 3. The bottom 20 of the capsule will be pierced by the knives of a brew chamber 3 after which the bottom 20 forms the inlet side 26 of the capsule. In the brew chamber 3, fluid, such as hot water, will be dispensed into the interior of the capsule body 15. The interior of capsule body 15 is filled with a beverage ingredient, such as coffee grind or a different beverage ingredient, which mixes with the fluid dispensed therein. Typically, the pressure at which the fluid is dispensed into the capsule is 8 to 19 bars and may be dependent on the type of beverage to be prepared. By dispensing the fluid into the capsule 5, the pressure inside the capsule body 15 increases until the fluid pressure inside the capsule 15 is large enough the tear open the lid 17 (e.g. against an extraction plate forming a second brew chamber part 8). The upper side of the capsule 5 thereby forms the outlet side 25 of the capsule, through which the prepared beverage may escape towards an outlet of the beverage preparation machine.

The flange 22 comprises an upper side 29 and a lower side 28. As will be explained further below, the flange 22 is formed such as to provide a seal 30 (see FIG. 3) for sealing the brew chamber in use. Typically, the seal 30 is located on the lower side 28 of the flange 22 for cooperating with a rim of the first brew chamber part 7 (see FIGS. 2A-2C).

The angle α of the slanted wall portion 35 is such as to enable some slipping of the knives of the brew chamber upon engaging with the slanted wall portion, in particular in a situation wherein the longitudinal axis 38 of the capsule and central axis 13 through brew chamber are not well aligned. The angle of the slanted wall portion of the capsule with respect to the longitudinal axis is smaller than 60 degrees, preferably smaller than 55 degrees. At the given angles, an obtainable static friction coefficient of the slanted wall portion upon engaging of the knives may be within a range of 0.25 to 0.40, preferably between 0.30 and 0.35, such as 0.32.

Figure 2A:
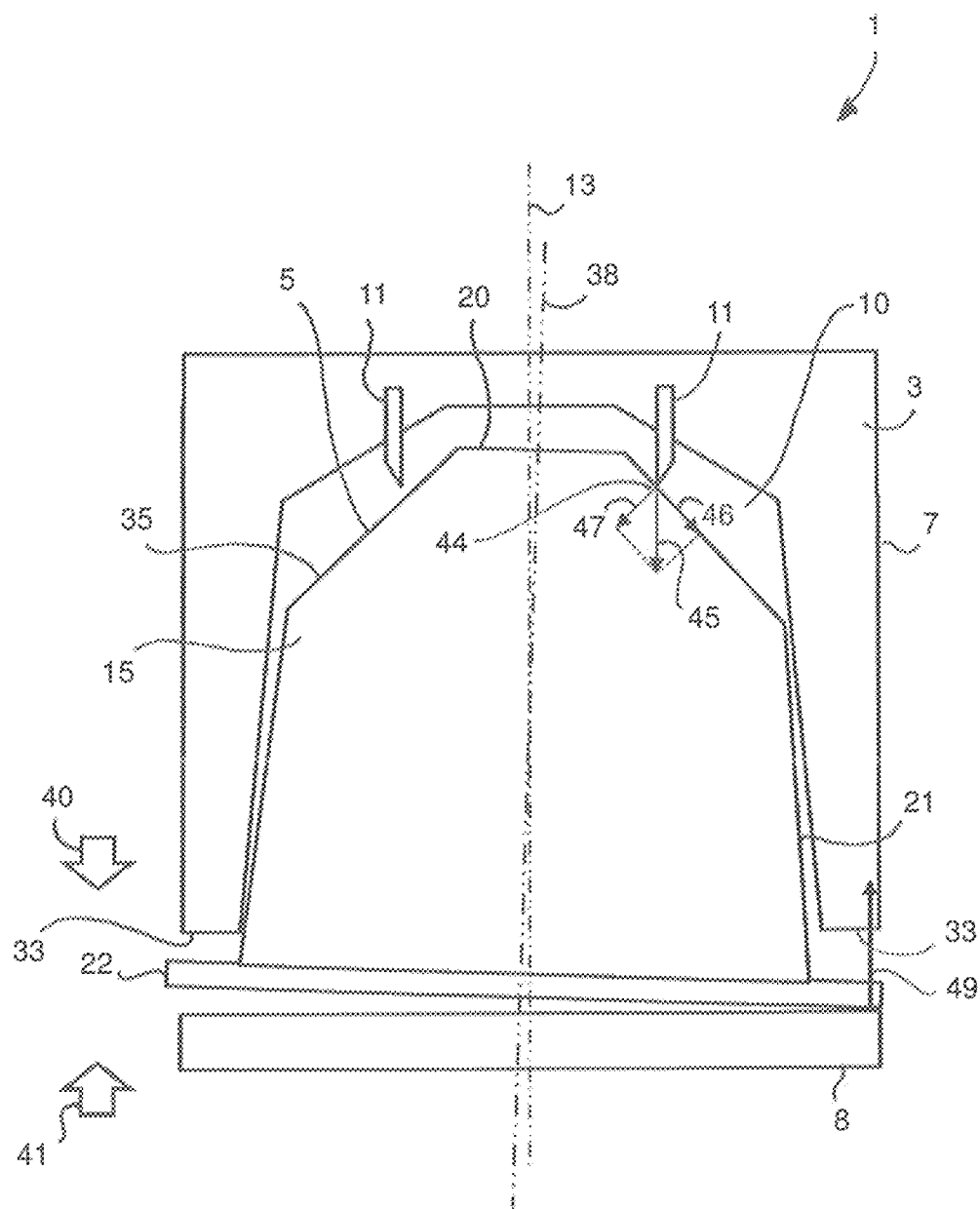
FIGS. 2*a-c* schematically illustrate interaction between a brew chamber and a self-centering capsule in an assembly in accordance with an embodiment.
Figure 2B:
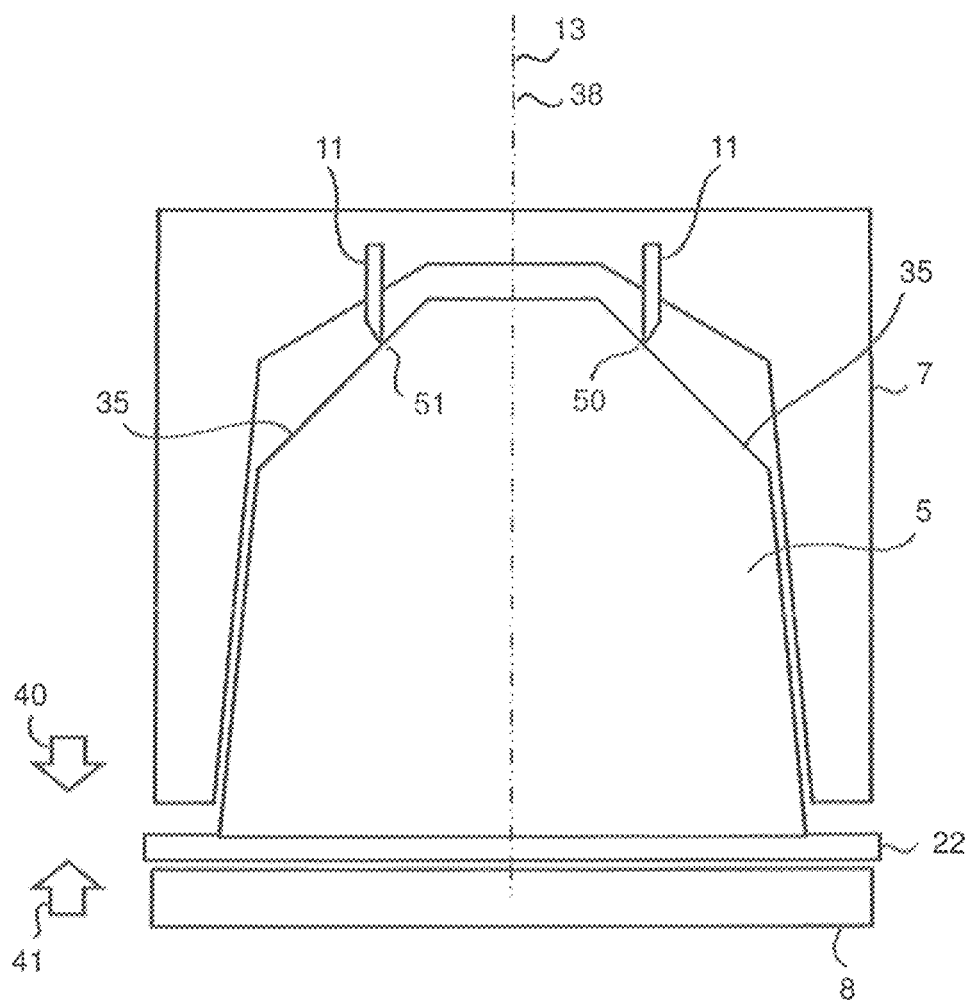
Figure 2C:
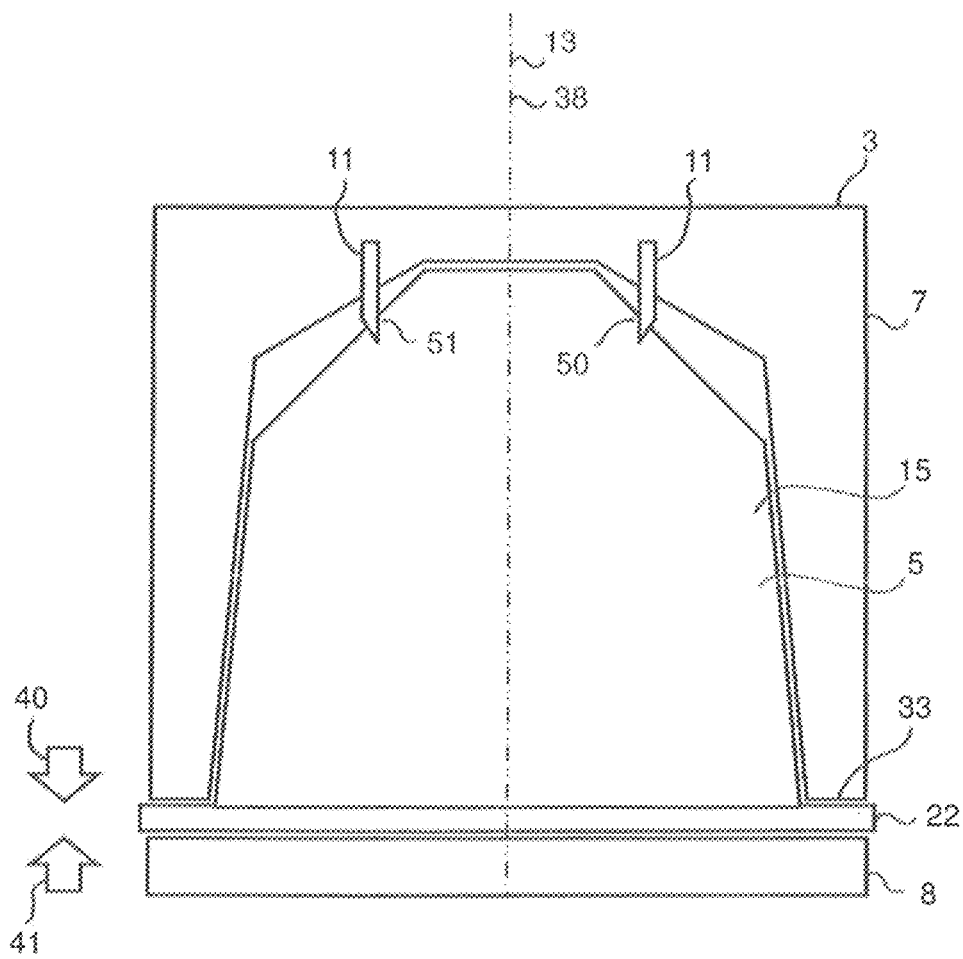

The principle of centering is schematically illustrated in FIGS. 2A through 2C. In these figures, an assembly in accordance with an embodiment of the present invention is schematically illustrated. Again, various details of both the brew chamber 3 and the capsule 5 of the assembly 1 of the present invention have been omitted in order to not obscure the description therewith. The illustrations in FIGS. 2A through 2C are purely schematic such as to explain the principle of the present invention. In the assembly 1, the brew chamber 3 consists of a first brew chamber part 7 and a second brew chamber part 8. The second brew chamber part 8 typically provides the extraction plate and cooperates with a first brew chamber part 7 which comprises the cavity 10 for holding the capsule 5. In the situation in FIG. 2A, the capsule 5 is already for a large part located in the cavity 10 provided by the first brew chamber part 7. However, the capsule 5 is not well centered with the cavity 10, and likewise with the concentrically arranged knives 11 in the cavity 10. This is illustrated by the central axis 13 of the brew chamber 3 and the longitudinal axis 38 through the capsule 5. As can be seen in FIG. 2A, the central axis 13 and the longitudinal axis 38 are not aligned. This causes one of the knives 11 to already engage with the slanted wall portion 35 of the capsule 5 at point 44. Because during closing of the brew chamber 3, the second brew chamber part 8 and the first brew chamber part 7 move towards each other as is indicated by the arrows 40 and 41, the second brew chamber part 8 engages with the flange 22 on the right side of FIG. 2A while there is no contact between the flange 22 and the second brew chamber part on the left side of FIG. 2A. In the situation illustrated in FIG. 2A, the motion of the first brew chamber part 7 and the second brew chamber part 8 relative to each other causes the knife 11 in point 44 to exert a force 45 on the slanted wall portion 35 of the capsule 5. At the same time, a second brew chamber part 8 on the right side of the figure exerts a contact force 49 illustrated in FIG. 2A. The force 45 of the knife 11 on the slanted wall portion 35 in location 44, resolves into a component 46 parallel to the slanted wall portion 35 and a component 47 perpendicular to the slanted wall portion 35. The component 46 parallel to the slanted wall portion is large enough to allow some slipping of the knife 11 on the surface of the slanted wall portion. In view of the torque created between forces 45 and 49, this causes a slight rotation of the capsule 5 to thereby align the longitudinal axis 38 with the central axis 13: a centering action of the capsule 5.

As may be appreciated, the angle α 36 of the slanted wall portion 35 is an important factor in determining whether knives 11 in point 44 will slip across the surface (enabling the self centering effect) or whether piercing of the slanted wall portion 35 will occur more readily than slipping. If no slipping occurs, and the knife 11 will pierce through the capsule wall first, the capsule 5 will become stuck and the sealing of the capsule in the brew chamber 3 may be insufficient. For example, without the self centering effect of the capsule, the flange 22 may become damaged or a slit or insufficient sealing is left open on one side of the capsule. In that case, fluid may leak out of the brew chamber 3 during preparation of the beverage. This in particular occurs where the flange 22 cooperates with the rim 33 of the first brew chamber part 7 to obtain a proper sealing. Note that details of the flange 22 and how it cooperates with the rim 33 will be described further below with reference to FIG. 3.

The self centering effect of the capsule 5 in the brew chamber 3 will continue until the central axis 13 and the longitudinal axis 38 of the brew chamber and the capsule respectively are well aligned. This situation is illustrated in FIG. 2C. As a result, prior to piercing all knives 11 of the brew chamber 3 will engage with the slanted wall portion 35 of the capsule 5. In FIG. 2B, this is illustrated by the knives 11 engaging with the capsule 5 in locations 50 and 51 on the slanted wall portion 35. Upon further moving of the second brew chamber part 8 towards the first brew chamber part 7 of the brew chamber 3, as indicated by arrows 40 and 41, the capsule 5 will be pierced by the knives 11. This situation is illustrated in FIG. 2C. The schematic illustration of FIG. 2C shows that the capsule 5 is pierced by the knives 11 in locations 50 and 51, whereas the flange 22 cooperates well with the rim 33 of the first brew chamber part while being clasped in between the first brew chamber part 7 and the second brew chamber part 8. The clasping of the flange 22 between the first brew chamber part and the second brew chamber part 8 in combination with the exerted pressure indicated by arrows 40 and 41, provides for the sealing of the brew chamber as will be explained with reference to FIG. 3 below.

Figure 3:
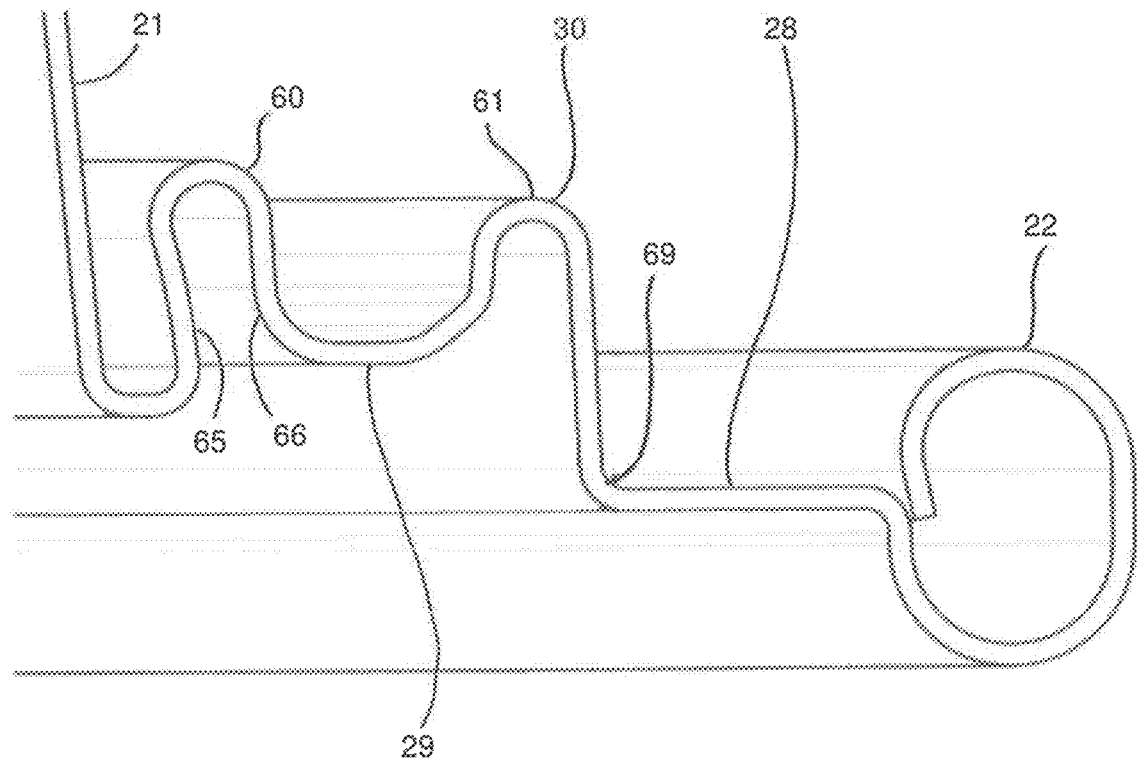
FIG. 3 illustrates a cross-section of a flange of a capsule for use in an assembly in accordance with an embodiment.

FIG. 3 shows a cross section of the flange 22 in close up thereof. On the left side of FIG. 3, a part of the side wall 21 of the capsule 5 is visible. The flange 22 is folded during manufacturing of the capsule 5 such that in cross section a seal 30 is formed thereon. The seal 30 is an M-shaped seal that cooperates with grooves and edges present on the rim 33 of the first brew chamber part 7. In FIG. 3, the upper side 29 and the lower side 28 of the flange 22 are illustrated. The seal 30 consists of an outer ring 61 that will form the contact surface of the seal. An inner ring 60 will serve as an elastic element during engaging of the rim 33 with the flange 22. The inner ring 60 consists of a first wall 65 and a second wall 66 that may flex towards and away from each other via the bending curve of the inner ring 60. Bent 69 of the flange 22 forms a virtual hinge.

The consolidated description below explains how the M-seal 30 on flange 22 works. The rim 33 of the first brew chamber part 7, includes a groove between two edges. Sealing is obtained by cooperation between the groove on the rim 33 of the first brew chamber part 7 and the outer ring 61. The inner ring 60, with first wall 65 and second wall 66, thereby acts as elastic element, enabling outer ring 61 to adapt its shape to the groove in the first brew chamber part 7 to provide a sufficient hydraulic seal 30 for acceptable brewing performance.

Hereinabove, a particular embodiment of a seal has been described. It will be understood that the present invention is not limited by the details of the described seal. A seal may be embodied differently than as specifically described herein. For example, generally, the seal may extend in a radial direction from a longitudinal axis through the capsule. The seal may comprise a base. The base may extend in the radial or substantially radial direction and may comprise raised and/or lowered portions that are configured to cooperate with the rim of a brew chamber. Such raised or lowered portions may be formed by the folded aluminum wall, e.g. for example as described above or differently formed. Alternatively or additionally, sealing elements or additional sealing structures may be present on the flange or seal. For example, elements that increase a force that is exerted between the rim and the seal may be present, such as elastic or flexible parts.

Figure 4:
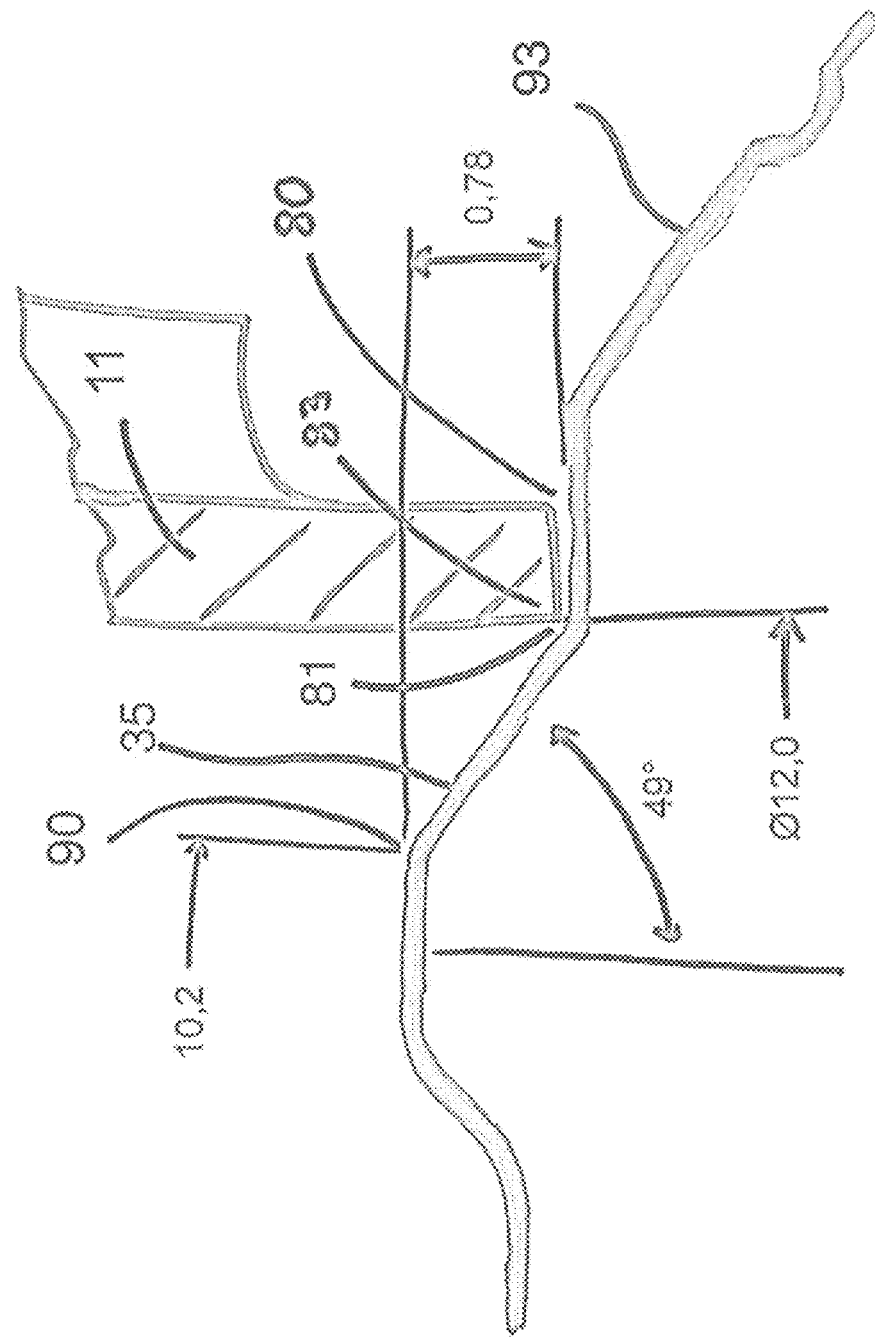
FIG. 4 illustrates a capsule in accordance with an embodiment of the invention.

Another embodiment of the present invention is illustrated in FIG. 4. Here the capsule 5 comprises a circumferential ledge 80, serving as piercing area, arranged in a ring around the slanted wall portion 35. At least some of the knives will engage with the slanted wall portion 35 if the capsule is not well centered. Upon centering of the capsule 5, the knives engage on the ledge 80 around the slanted wall portion, and penetrate the capsule 5. Preferably, the ledge 80 is directly contiguous to the slanted wall portion 35 in a circumferential arrangement. Preferably, a diameter of the inner edge 81 of the ledge 80 corresponds with the mutual relative locations of the knives such that, as illustrated in FIG. 4, the inner edges 83 of the knives 11 abut against the inner edge 81 of the ledge 80. This ensures an optimal centering of the capsule 5 before piercing occurs.

In the capsule 5 of FIG. 4, circumferentially around the ledge 80, the capsule bottom comprises a further wall portion 93. The further wall portion is also oriented under an angle with the longitudinal axis 38 through the capsule 5. This provides for an increased volume of the capsule 5. Moreover, the overall shape of the bottom including the slanted wall portion 35, the ledge 80 and the further wall portion 93, due to the curves and bends, provides for an increased structural integrity as a result of it's shape. This minimizes bending of the bottom under pressure of the piercing knives 11 upon engaging thereof. Preferably, even, the orientation of further wall portion 93 is such that inner edge 90 of the slanted wall portion 35 (closest to longitudinal axis 38) is located in line with the tangent of wall portion 93. With the ledge 80 in between the slanted wall portion 35 and the further wall portion 93, the angle of slanted wall portion 35 with respect to the longitudinal axis 38 (here 49 degrees) can be smaller than the angle between the further wall portion 93 and the longitudinal axis 38, for further decreasing the friction coefficient of the slanted wall portion 35 for improving it's centering ability.

Preferably a capsule with the arrangement of FIG. 4, comprises a flange 22 includes an M-type seal 30, similar to the seal illustrated in FIG. 3. Instead of the M-type seal 30, illustrated in FIG. 3, the sealing arrangement located on the flange 22 may be of a different type. For example, a different seal is illustrated in FIGS. 5A to 5C and FIG. 6. Any of the sealing arrangements illustrated in the FIGS. 3, 5A to 5C, and FIG. 6, may be applied in combination with the various capsule designs falling under the scope of the claims, e.g. as discussed herein such as the embodiments of any of FIG. 1, or 2A to 2C.

Figure 5A:
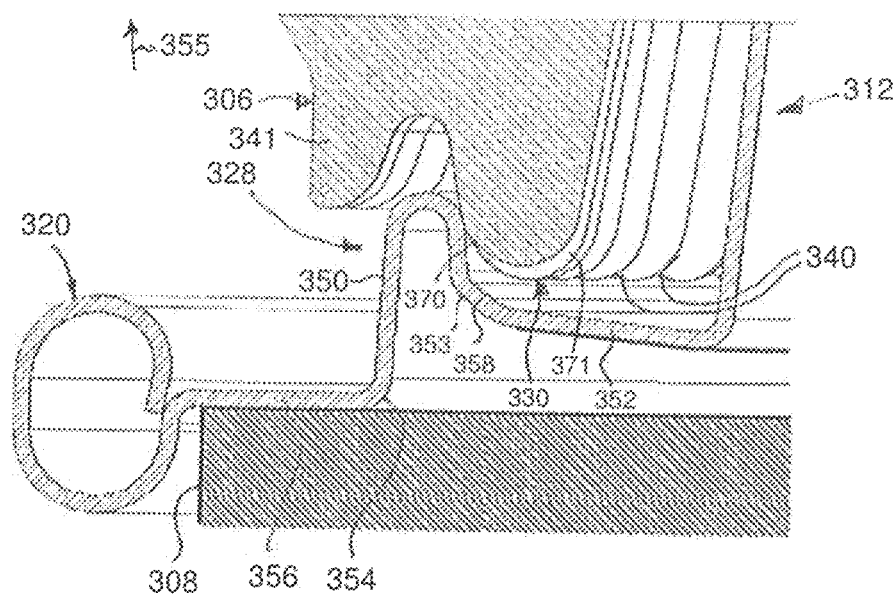
FIGS. 5A to 5C illustrate various cross-sections of different sealing arrangements.

FIG. 5A shows an embodiment of a sealing member 328 forming an additional bearing at the outwardly extending flange 320 of a capsule body 312. The sealing member 328 and the remainder of the capsule body 312 are made of the same plate material. The sealing member 328 has a projection 350, projecting axially from inner and outer foot portions 353, 354 in an axial direction 355 towards the bottom of the capsule body 312. A trough having a bottom 352 is located inwardly adjacent to the projection 350. The bottom 352 of the trough is positioned at axially distance from the outer foot 354 of the projection 350 in the direction 355 of the bottom of the capsule body 312 and also from a portion 356 of the outwardly extending flange 320 between the sealing member 328 and the curled edge and is substantially flat.

The first brew chamber part 306, comprises an annular element 341 with an inner ridge 360 and a free contact end 330. Further, the projection 350 and the bottom 352 of the trough are arranged such that the free contact end 330 of the annular element 341 is contacted by the bottom 352 of the trough if the capsule is positioned in the first brew chamber part 306 of the beverage preparation device and the first brew chamber part is closed by the second brew chamber part 308.

The distance between the projection 350 and a side wall 316 of the capsule body 312 is preferably 0.9-1.25 mm, which allows the inner ridge 360 of the first brew chamber part 306 of widely used and commercially available beverage preparation devices (such as the Citiz, Lattisima, U, Maestria, Pixie, Inissia and Essenza) to be reliably squeezed against the projection 350 with the side wall 316 in close proximity thereto, but slightly spaced from the side wall 316.

The projection 350 has a projection top constituting a portion of the projection, for instance a half, a third or a quarter of the projection that is axially most distal from the feet 353, 354 of the projection 350. The projection 350 is configured such that its projection top exerts a radial force on the free contact end 330 of the annular element 341 if the capsule is positioned in the first brew chamber part 306 of the beverage preparation device and the first brew chamber part is closed by means of a second brew chamber part 308 of the beverage preparation device.

Figure 5C:
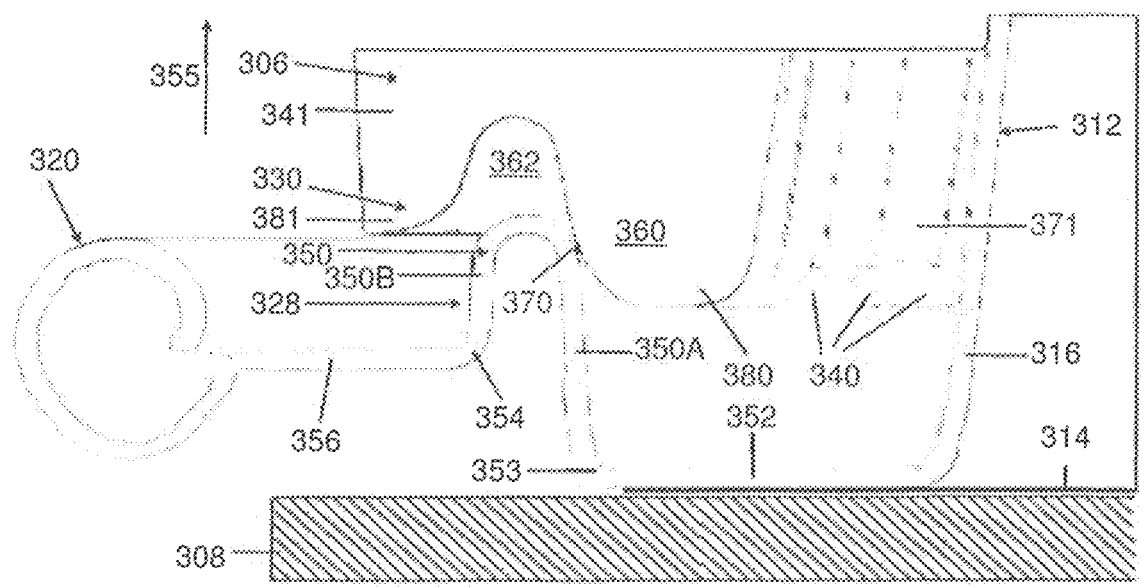
Figure 5B:
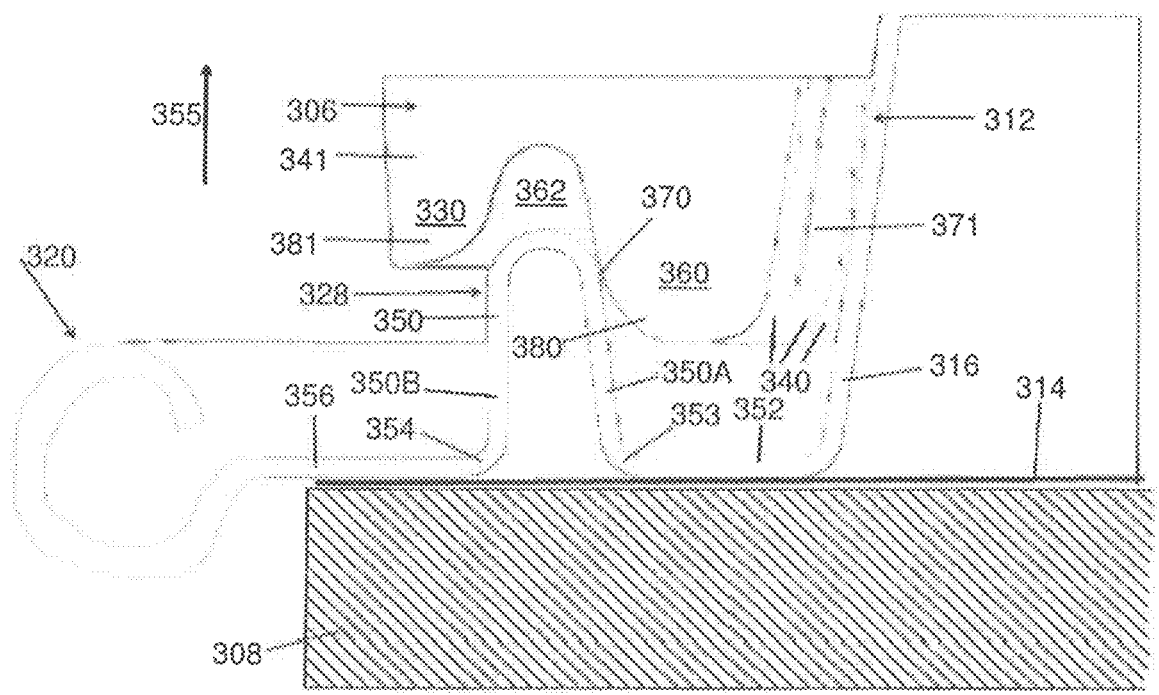

FIG. 5B shows a further embodiment of a sealing member 328 forming an additional bearing at the outwardly extending flange 320 of the capsule body 312. The sealing member 328 and the remainder of the capsule body 312 are made of the same plate material. The sealing member 328 has a single projection 350, projecting axially from inner and outer foot portions 353, 354 in an axial direction 355 towards the bottom of the capsule body 312. A trough having a flat inner flange portion 352 is located inwardly adjacent to the projection 350. The flat inner flange portion 352 of the trough is positioned at the same height as the outer foot 354 of the projection 350 and also at the same height as the flat outer flange portion 356 of the outwardly extending flange 320 between the sealing member 328 and the curled outer edge 343.

Further, the projection 350 and the flat inner flange portion 352 of the trough are arranged such that the free contact end 360 of the annular element 341 is contacted by the flat inner flange portion 352 of the trough if the capsule is positioned in the first brew chamber part of the beverage preparation device and the first brew chamber part is closed by the second brew chamber part 308.

The distance between the projection 350 and a side wall 316 of the capsule body 312 is preferably 0.9-1.25 mm, which allows the inner ridge or free contact end 360 of the first brew chamber part 306 of widely used and commercially available beverage preparation devices (such as the Citiz, Lattisima, U, Maestria, Pixie, Inissia and Essenza) to be reliably squeezed against the projection 350 with the side wall 316 in close proximity thereto, but slightly spaced from the side wall 316.

The projection 350 has a projection top constituting a portion of the projection, for instance a half, a third or a quarter of the projection that is axially most distal from the feet 353, 354 of the projection 350. The projection 350 is configured such that its projection top exerts a radial force on the free contact end 330 of the annular element 341 if the capsule is positioned in the first brew chamber part 306 of the beverage preparation device and the first brew chamber part is closed by means of the second brew chamber part 308 of the beverage preparation device.

In a further sealing arrangement shown in FIG. 5C a sealing member 328 forms an additional bearing at the outwardly extending flange 320 of the capsule body 312. The sealing member 328 and the remainder of the capsule body 312 are made of the same plate material. The sealing member 328 has a single projection 350, projecting axially from inner and outer foot portions 353, 354 in an axial direction 355 towards the bottom of the capsule body 312. A trough having a flat inner flange portion 352 is located inwardly adjacent to the projection 350. The flat inner flange portion 352 of the trough is positioned at an axial distance from the outer foot 354 of the projection 350 in a direction away from the bottom of the capsule body 312 and also at an axial distance away from a flat outer flange portion 356 of the outwardly extending flange 320 between the sealing member 328 and the curled outer edge 343.

Further, the projection 350 and the flat inner flange portion 352 of the trough are arranged such that the free contact end 360 of the annular element 341 is contacted by the flat inner flange portion 352 of the trough if the capsule is positioned in the first brew chamber part of the beverage preparation device and the first brew chamber part is closed by the second brew chamber part 308.

The distance between the projection 350 and a side wall 316 of the capsule body 312 is preferably 0.9-1.25 mm, which allows the inner ridge or free contact end 360 of the first brew chamber part 306 of widely used and commercially available beverage preparation devices (such as the Citiz, Lattisima, U, Maestria, Pixie, Inissia and Essenza) to be reliably squeezed against the projection 350 with the side wall 316 in close proximity thereto, but slightly spaced from the side wall 316.

The projection 350 has a projection top constituting a portion of the projection, for instance a half, a third or a quarter of the projection that is axially most distal from the feet 353, 354 of the projection 350. The projection 350 is configured such that its projection top exerts a radial force on the free contact end 330 of the annular element 341 if the capsule is positioned in the first brew chamber part 306 of the beverage preparation device and the first brew chamber part is closed by means of the second brew chamber part 308 of the beverage preparation device.

Figure 6:
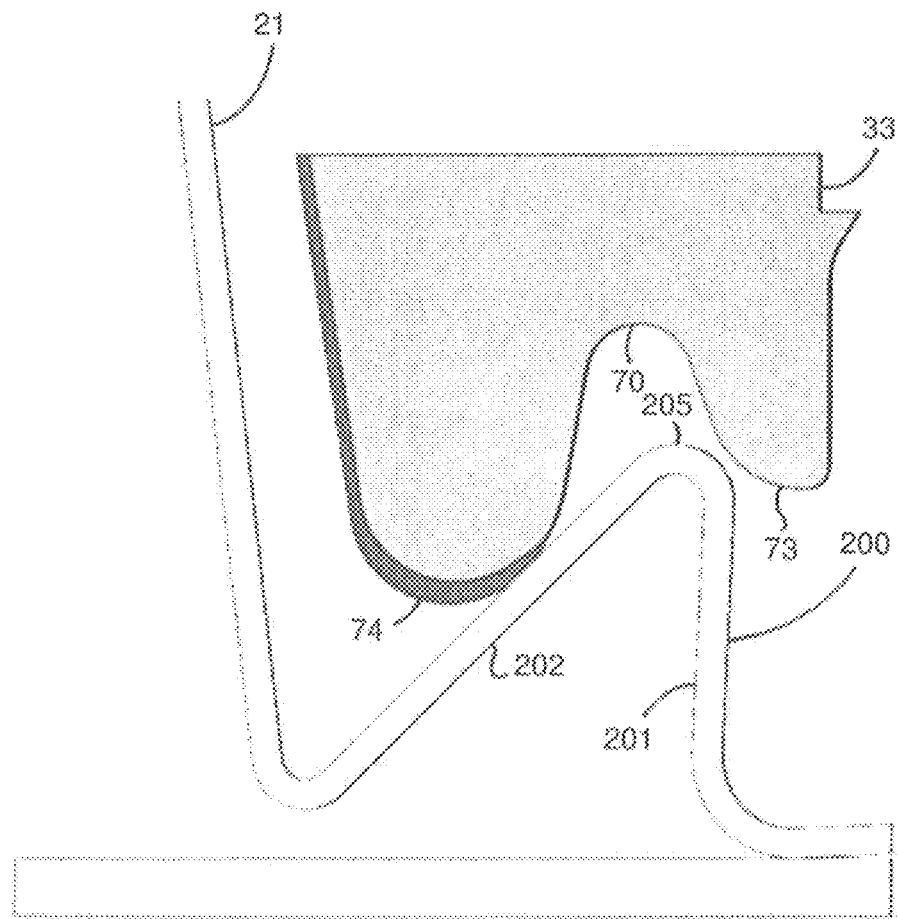
FIG. 6 illustrates a cross-section of a sealing arrangement.

FIG. 6 shows a further alternative seal 200 having a V-shaped arrangement of walls 201 and 202. With seal 200, upon closing of the brew chamber, the wall 202 bends, causing the apex 205 to form a tight seal in the groove 70 when the rim 33 closes the brew chamber.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A capsule for the preparation of a beverage from a beverage preparation machine, the capsule being configured for being inserted into a brew chamber of the beverage preparation machine, wherein the brew chamber is closable by closing of a first brew chamber part with a second brew chamber part cooperating therewith, the first brew chamber part having a cavity for holding the capsule, and further including a plurality of knives located in the cavity concentrically arranged around a central axis of the brew chamber,
   wherein the capsule comprises a capsule body and lid closing an open end of the capsule body, the capsule body being frusto conically shaped, wherein the capsule body comprises a bottom opposite the open end, a side wall extending from the bottom, and a flange extending outwardly from the side wall near the open end, wherein the lid is attached to the flange and is configured to be opened under fluid pressure for forming an outlet side of the capsule, wherein the bottom of the capsule is configured to be pierced by the knives of the brew chamber for forming an inlet side of the capsule, and wherein the capsule body and the lid are made from aluminum;
   wherein the flange of the capsule is wider than the bottom, and wherein the flange is configured to be held between the first brew chamber part and a second brew chamber part of the brew chamber, the flange being formed such as to provide a seal, wherein the seal is configured for cooperating with a rim of the first brew chamber part for sealing the brew chamber upon closing thereof; and
   wherein the bottom of the capsule comprises a slanted wall portion which is circumferentially arranged around a longitudinal axis of the capsule, wherein the slanted wall portion is configured for cooperating with the knives such that the knives engage with the slanted wall portion upon closing of the brew chamber, wherein the slanted wall portion is oriented under an angle with the longitudinal axis, for centering the capsule relative to the central axis of the brew chamber prior to piercing of the capsule due to slipping of at least one of the knives upon engaging of the at least one of the knives on the slanted wall portion.

2. The capsule according to claim 1, wherein the bottom of the capsule comprises a ledge, wherein the ledge is concentrically arranged around the slanted wall portion and contiguous therewith, for providing a piercing ledge for piercing the capsule after centering thereof.

3. The capsule according to claim 2, wherein the rim includes a groove and wherein the flange is folded such as to form an outer ring or protrusion that falls into a groove located on the rim upon closing of the first brew chamber part with the second brew chamber part after said centering of the capsule.

4. The capsule according to claim 1, wherein the bottom of the capsule comprises a further wall portion concentrically arranged around the slanted wall portion, the further wall portion being oriented under a further angle with the longitudinal axis.

5. The capsule according to claim 4, wherein the angle of the slanted wall portion of the capsule with respect to the longitudinal axis is smaller than 60 degrees.

6. The capsule according to claim 4, wherein the angle of the slanted wall portion of the capsule with respect to the longitudinal axis is smaller than 55 degrees.

7. The capsule according to claim 1, wherein the seal is configured for being clasped against the rim of the first brew chamber part for providing the sealing of the brew chamber, and wherein the seal is formed of a folded wall portion of the flange.

8. The capsule according to claim 7, wherein the rim comprises at least one of an edge or a groove arranged for cooperating with the seal such as to exert sealing force, and the folded wall portion is correspondingly shaped with the at least one edge or groove of the rim for enabling the sealing of the brew chamber.

9. The capsule according to claim 1, wherein the angle of the slanted wall portion with respect to the longitudinal axis is dependent on one or more material properties of the capsule, wherein the material properties include at least one of: a material hardness of the capsule body, a surface roughness of the slanted wall portion, and a wall thickness of the capsule body.

10. The capsule according to claim 1, wherein in combination with the angling of the slanted wall portion, a maximum static friction coefficient within a range of 0.25 to 0.40, is obtained by at least one of:
   a material hardness of at least a part of the capsule body;
   a surface roughness of the slanted wall portion;
   a coating on the slanted wall portion or on at least a part of the capsule body; and
   a wall thickness of the capsule body.

11. The capsule according to claim 1, further comprising a piercing area arranged circumferentially around the slanted wall portion, the piercing area having a surface oriented substantially transverse to the longitudinal axis.

12. The capsule according to claim 11, wherein an inner edge of the piercing area is at a distance of 11 to 13 millimeter from the longitudinal axis.

13. The capsule according to claim 1, wherein the capsule is hermetically closed.

14. The capsule according to claim 1, wherein in combination with the angling of the slanted wall portion, a maximum static friction coefficient within a range of 0.30 to 0.35 is obtained by at least one of:
   a material hardness of at least a part of the capsule body;
   a surface roughness of the slanted wall portion;
   a coating on the slanted wall portion or on at least a part of the capsule body; and
   a wall thickness of the capsule body.

\* \* \* \* \*